Patented Oct. 7, 1952

2,613,150

UNITED STATES PATENT OFFICE 2,613,150

METHOD OF MAKING A COLD-MIXING FOOD STARCH POWDER

Alfred A. Halden, New York, N. Y., assignor to National Starch Products Inc., New York, N. Y., a corporation of Delaware No Drawing. Application May 17, 1949, Serial No. 93,850

8 Claims. (Cl. 99—139)

This invention relates to cold-mixing food starch powders and their preparation.

The prime objects of the present invention are (1) the improved preparation of cold-mixing food starch powders and (2) the making of starch powders which may be used, without the necessity of cooking, for making improved puddings, as well as meringues, icings, marshmallow compounds, and similar food compositions.

Starch pudding powders have ordinarily been prepared by mixing dry, ungelatinized starch with sugar and flavoring materials. In order to prepare the pudding, it has been necessary to cook this blend in milk or water, in order to gelatinize the starch, followed by cooling and congealing of the gelatinized mass.

Starch pudding powders prepared in accordance with the practice of the present invention consist of a dry, specially pre-gelatinized starch base such that, after addition of sweetening and flavoring materials, the blend may be easily dispersed in cold or warm milk or water to produce a pudding of excellent flavor and texture. The time-saving in the elimination of the cooking step, together with the ease of preparation and excellent quality, make the commercial desirability and value of such a cold-mixing pudding powder self-evident.

Because of the above-mentioned desirability of a cold-mixing dry pudding powder, various attempts have been made in the past to achieve such a pre-gelatinized starch product. Thus, it has been suggested to cook starch in water and then to spray-dry the fluid mass, the dried material being subsequently blended with sweeteners and flavoring adjuncts. However, the quality of such a product is not satisfactory, since it frequently does not form a sufficiently smooth dispersion in fluids, and the pudding is not free of undesirable starchy taste. The reasons for these disadvantageous qualities will become apparent from the subsequent discussion of the product of the present invention.

It has also been proposed to pre-gelatinize starch by passing a starch-water suspension over heated drums in order to gelatinize and dry the starch, subsequently adding sugar and flavoring materials to the dried mass, and grinding. This, too, does not result in a satisfactory pudding mix. Firstly, it does not disperse with sufficient speed and ease in cold milk or water. When the pudding is finally formed, its texture is not sufficiently smooth and soft, as compared with cooked puddings, and it is frequently characterized by an unpleasantly starchy taste. In other words, there is a lack of homogeneity both with regard to texture and flavor. If it is attempted to improve the homogeneity by comminuting or grinding the gelatinized starch extremely fine, it is found that a substantial amount of lump formation is encountered upon mixing the powder in the milk or water, so that the pudding texture is worsened rather than improved.

Furthermore, if cereal starches (of which corn starch is typical) are used in this gelatinization-drying process, the resultant pudding will be especially characterized by objectionable graininess. Under conditions of gelatinization and drying over heated drums, cereal starches are characterized by relatively rapid retrogradation. In other words, when such starches are gelatinized and dried by passing them in water suspension over heated drums, it is found that the resultant dried product is not readily and smoothly redispersable in cold milk or water, since a substantial portion of the starch has retrograded to a state wherein it is comparatively insoluble and non-dispersable. The result is an undesirable graininess in a pudding so made.

Aside from the disadvantages with regard to dispersability, texture, and flavor, an additional difficulty has been encountered when attempting to make such a pudding-mix from a tuber-starch base. Tuber-type starches, as represented by tapioca and potato starch, as well as by waxy maize starch (which, although derived from grain, possesses many of the typical characteristics of tuber-starches), are characterized by the property of forming a highly cohesive mass upon cooking in water. It is found that when a water suspension of such starch is passed over heated drums, a dried film is formed which is so tough, leathery, and cohesive that it is difficult to handle, remove properly from the drums, and grind at economical production rates. This difficulty exists even when the starches have been pre-treated so as to reduce their cohesive qualities to some extent.

It is thus seen that regardless of the starch type used, it has not been possible heretofore to produce a cold-mix pudding powder which could be readily dispersed in cold milk or water to produce a pudding of excellent texture and flavor.

By the present invention, starch powders are produced which can be dispersed easily in milk or water, without cooking, and without objectionable lump formation, to form puddings characterized by an excellence of taste, smoothness, softness, and homogeneity of texture far superior to heretofore known cold-mixed puddings. As previously stated, the powder of the present invention is equally of value for making not only puddings but other improved cold-mix food products, such as meringues, marshmallow compounds, icings, and the like.

The powder of the present invention is based upon pre-gelatinized, dried tuber-type starch, characterized by the fact that a minor proportion of sugar is added to and dissolved in the starch in an aqueous medium prior to drying. By "minor proportion" is meant an amount substantially less than the dry weight of the starch. To embody the principles of the present invention, starch must be gelatinized and dried and added sugar must be present at the time of the drying operation. The preferred manner of carrying out this process is to suspend starch in water, dissolve sugar therein, and then pass this starch suspension, containing the sugar, over drums heated to a temperature to gelatinize and dry the starch in one operation. As a variant of this process, the sugar is added to the starch-water suspension, the starch is then gelatinized—as, for example, by heating the suspension beyond the gelatinization temperature of the starch— the obtained water dispersion of the gelatinized starch being subsequently dried—as, for example, by passing over heated drums—by spray-drying or other known drying methods. Since the fundamental feature of the invention is the presence of added sugar in the starch at the time of the drying operation (and not necessarily prior to the gelatinization), the process may also be practiced by making an aqueous suspension of starch, without added sugar, by then gelatinizing the same, followed by the addition of the sugar to and the dissolving of the sugar in the gelatinized starch dispersion, with subsequent drying. The presence of this sugar in the starch at the time of the drying operation, results in the following surprising improvements, as contrasted to starch gelatinized-dried in the absence of such sugar:

(1) When the dried starch-sugar mix is removed from the drums (in cases where the product is drum dried), ground, and blended with such additional sweeteners and flavoring materials as may be desired, it is found that the resultant blend disperses more readily and smoothly in cold milk or water, with substantial absence of lump formation. The texture of the pudding is soft and creamy. The taste of the final product is also greatly improved, a more uniform sweetness being apparent, without starchiness. It is believed that this improvement results from the fact that in the product of the present invention, sugar is present in a far more intimate state of dispersion throughout the starch than would have been possible by any dry blending operation. Since sugar is so highly soluble, the dispersed sugar in the starch mix in a sense provides countless pathways through which the later added milk or water quickly penetrates and disperses the starch before lumps can be formed. This same intimate dispersion of the sugar-starch mix would explain the notable improvement in taste as well as texture.

(2) Besides the above-mentioned improvements in quality of the product, it is found that the process of manufacture is also marked by advantages over previous methods. The dried starch film which is formed upon passing the starch-water suspension or starch milk (containing sugar) over heated drums, is of a relatively brittle (rather than leathery and tough) texture. Thus, it can be removed from the drums, be broken up, carried in conveyors, and otherwise handled with far greater ease. Furthermore, it is found that the subsequent grinding operation proceeds considerably more efficiently because of the brittle nature of the film.

For the tuber-type starch in the present process, any starch is used or mixture of tuber-type starches which, after the gelatinization and drying operation, may be redispersed in milk or water to give a satisfactory pudding texture. This pudding quality is well recognized in the food industry as comprising a relatively soft, non-rubbery, non-cohesive texture. Since corn starch tends to retrograde, as already explained, and since untreated tuber-type starches result in puddings which are too rubbery and cohesive, it is found necessary to use tuber-type starches which have been pre-treated so as to reduce the natural rubbery cohesiveness of their gelatinized dispersions. Examples of such pre-treatment are described in U. S. Patent No. 2,317,752, granted April 27, 1943. Another method of reducing the natural cohesiveness of tuber or tuber-type starches such as tapioca or waxy maize, is described in U. S. Patent No. 2,500,950, granted March 21, 1950. These treatments act to reduce the tendency of the starch to swelling in water; and in said patents, such pretreated starch is referred to as an "inhibited starch." In said Patent No. 2,317,752, such treatment to produce such "inhibited" starch is described as a treatment of the starch to retard the bursting and disintegration of an appreciable number of granules under conditions wherein the corresponding untreated starch granules do so burst and lose their identity. In said Patent No. 2,500,950, it is set forth that the starch is pretreated so that when mixed with water (and subjected to normal gelatinizing conditions) the bursting of the granules will be inhibited, and the resultant product will be non-cohesive relatively to the corresponding untreated starch.

As the added sugar to be present in the starch at the time of the drying operation, any desired type may be used, such as cane or corn sugar. It is preferred, for reasons of economy and convenience, to use glucose syrup, which is a liquid corn sugar containing approximately 80% sugar and dextrin solids. It should be emphasized at this point that the sugar which is added to the starch prior to drying, is not added primarily as a sweetening agent. This will be evident from the fact that following the gelatinization and drying operation, it is ordinarily necessary to add substantial additional quantities of sugar before the mix is of satisfactory sweetness for food purposes. The function of the sugar present prior to the drying operation, has already been described as comprising the improvement of the dispersing properties, taste, and texture of the subsequent dry mix, as well as the facilitation of the drum-drying step, entirely apart from the incidental sweetening effect.

The proportion of sugar to be added to the starch prior to drying may be varied over a rather wide range. Thus, as little as 10% of sugar, based on the commercial dry weight of the starch, results in the improvements heretofore described. The upper limit of the proportion of sugar to be added is controlled by the fact that too great proportions of sugar will cause the gelatinized and dried starch mix to become rather hygroscopic, with resultant difficulty in removal from the heated drums. Ordinarily, it is not advisable;

for this reason, to add more than 50% of sugar to the starch suspension or dispersion, prior to drying. This upper limit will also be affected, obviously, by the type of sugar used, glucose syrup being more hygroscopic than cane sugar.

The following examples will further illustrate the embodiment of the present invention.

Example I

One hundred (100) parts of high-grade tapioca starch are pre-treated in accordance with the method of Example I of U. S. Patent No. 2,317,752—namely, by stirring the starch and 0.5 part urea in 120 parts water, adding 9.36 parts of a sodium hypochlorite solution (containing 5.34% available chlorine), allowing to react overnight, then adding sufficient sodium bisulfite to remove any excess available chlorine, adjusting to pH 6.5, followed by filtering, washing, and drying. This pre-treatment reduces the natural rubbery cohesiveness of the starch when in a gelatinized state.

One hundred (100) parts of the dry, pre-treated, ungelatinized tapioca starch are suspended in approximately 250 parts water. To the starch milk thus produced are added, with agitation, 30 parts of glucose. The resulting suspension is passed between revolving drums heated to a steam pressure of approximately 100 pounds per square inch, the speed and distance between the drums being adjusted, by means which will be apparent to those in the art, to assure thorough gelatinization and drying of the starch. The dry starch is scraped from the rolls by doctor blades or similar methods. The starch is then comminuted or ground so that at least 90% will pass through a screen of 200 mesh or finer.

If this example is repeated, using 10 parts of glucose instead, a product of comparable quality is obtained.

In this, as in all other examples, parts given are by weight, and temperature is room temperature, unless otherwise stated.

Illustrations of the use of this starch base in the preparation of complete pudding mixes, meringues, marshmallow mixes, and icings are given in Examples V, VI, and VII.

Example II

One hundred (100) parts of a waxy maize starch are pre-treated in accordance with the method described in Patent No. 2,500,950—namely, by suspending the starch in 150 parts of water containing 0.8 part of sodium hydroxide dissolved therein. To this suspension is added 0.1 part of epichlorohydrin. Agitation is continued for approximately 15 hours. The alkali is then neutralized with dilute mineral acid, the starch filtered, washed well with water, and dried.

One hundred (100) parts of the pre-treated waxy maize starch are suspended in approximately 200 parts of water, with agitation, and 50 parts cane sugar are dissolved therein. The suspension is passed between heated revolving drums, as in Example I, the temperature and speed of the drums being regulated so as to bring about gelatinization and drying of the starch, which is removed from the rolls and comminuted or ground, as in Example I.

Example III

One hundred (100) parts of the pre-treated tapioca starch of Example I are suspended in approximately 700 parts water, with agitation, in a jacketed tank. Thirty (30) parts glucose syrup are dissolved therein, and the mixture heated, with continuous agitation, until the starch is gelatinized. The dispersion is passed between heated revolving drums, as in Example I, the temperature and speed of the drums being regulated so as to bring about drying of the starch, which is removed from the drums and comminuted or ground, as in Example I.

Example IV

One hundred (100) parts of the pre-treated tapioca starch of Example I are suspended in approximately 700 parts water, with agitation, in a jacketed tank. The suspension is heated, with agitation, until the starch is gelatinized. Thirty (30) parts glucose syrup are then added to the starch dispersion. The dispersion is passed between heated revolving drums, as in Example I, the temperature and speed of the drums being regulated so as to bring about drying of the starch, which is removed from the drums and comminuted or ground, as in Example I.

Example V

This example illustrates the use of the pregelatinized starch base of the present invention in the preparation of a cold-mix pudding powder.

One hundred (100) parts of the gelatinized starch of any of Examples I to IV are blended thoroughly with 132 parts powdered cane sugar, 64 parts cocoa powder, 2.7 parts sodium chloride, and 2.7 parts powdered vanilla. One part of the powder is readily dispersed, without lump formation, in about 3.4 parts cold water or milk, preferably by whipping or mechanical agitation, whereupon it thickens to pudding consistency. It is to be noted that the proportion of sugar herein added to the starch base, as a sweetener, is far greater than the proportion used in preparing the pregelatinized starch base itself. The pudding is characterized by excellent taste and texture, as previously described.

Example VI

This example illustrates the use of the pregelatinized starch base of the present invention in the preparation of meringue-marshmallow type mixes for pies, cakes, and the like.

Forty-eight (48) parts of the pre-gelatinized starch base of any of Examples I to IV are thoroughly blended with 6 parts soya albumen, 8 parts dried egg albumen, 6 parts powdered gelatin, 1 part alum, 0.6 part citric acid, and 1 part citrus pectin. This blend is mixed in 480 parts cold water for half a minute, followed by the addition of 600 parts cane sugar, with subsequent high-speed agitation for about seven (7) minutes. A high quality meringue results, stable and devoid of the starchy flavor which frequently characterizes meringue-marshmallow type compounds containing raw starches or starches gelatinized by heretofore known methods. Obvious variations in the formula, to meet specific needs, will be apparent to those familiar with the art.

Example VII

This example illustrates the use of the pre-gelatinized starch base of the present invention in the preparation of cold-mix powders for icings.

The following ingredients are blended: 12 parts cocoa powder, 67 parts cane sugar, 1.5 parts dextrose, 2.9 parts dry skim milk powder, 12 parts shortening, 0.1 part salt, 1 part vanilla, and 3.5 parts of the pregelatinized starch base of any of Examples I to IV.

Cold water is mixed into the above powder in the approximate ratio of 1 part water to 8¾ parts powder (more or less water being used, depending upon the consistency desired).

The resulting icing is characterized by excellent smoothness and taste, being particularly free of any starch flavor. Another improved characteristic of icing powders made with the starch product of the present invention is their higher water tolerance. When such powders are mixed with water, especially in the household, quantities are not always measured exactly. Thus, the addition of only a slightly larger amount of water than that called for in previous icing powders often resulted in a drastic thinning of the icing. On the other hand, the starch base of the present invention absorbs water so quickly and readily that the powder of which it is a component may be mixed with quantities of water which vary from the prescribed formula to a considerably greater degree than heretofore permissible, without drastic change in the consistency of the icing. In other words, a greater margin of safety is attained.

The salient features of these examples are, firstly, the production of gelatinized starch products characterized by their excellent dispersability in cold milk or water, and, secondly, the use of these pre-gelatinized starch bases in the preparation of cold-mix puddings, meringues, marshmallow compounds, icings, and other food compositions; these products being characterized by their homogeneous, creamy, smooth texture, freedom from objectionable starchy taste, and generally excellent flavor.

What is claimed is:

1. The method of making a cold-mixing food starch powder, which consists in pretreating a starch selected from the class consisting of potato, tapioca and waxy maize to produce an inhibited starch, i. e., a starch characterized by the property that when mixed with water and subjected to normal gelatinizing conditions the bursting of the starch granules will be inhibited and characterized by a reduction of the natural rubbery cohesiveness of the starch when in a gelatinized state, in subjecting said inhibited starch in an aqueous medium to the steps of gelatinization, drying on heated drums and comminuting the drum dried starch powder, and in adding sugar to and dissolving the sugar in the aqueous suspension of said inhibited starch prior to the drying step, the dried inhibited starch-sugar mix obtained in the drum drying step being characterized by being relatively brittle and easily removable from the drum.

2. The method of claim 1, in which the added sugar is in amount substantially less in weight than the dry weight of the inhibited starch.

3. The method of making a cold-mixing food starch powder, which consists in pretreating a starch selected from the class consisting of potato, tapioca and waxy maize to produce an inhibited starch, i. e., a starch characterized by the property that when mixed with water and subjected to normal gelatinizing conditions the bursting of the starch granules will be inhibited and characterized by a reduction of the natural rubbery cohesiveness of the starch when in a gelatinized state, in adding sugar to such inhibited starch and water to make a water suspension of said inhibited starch with the sugar dissolved therein, then gelatinizing and drying on heated drums the said suspension and comminuting the resulting drum dried inhibited starch-sugar mix, the dried inhibited starch-sugar mix obtained in the drum drying step being characterized by being relatively brittle and easily removable from the drum.

4. The method of claim 3, in which the added sugar is in amount substantially less in weight than the dry weight of the inhibited starch.

5. The method of making a cold-mixing food starch powder which consists in pretreating a starch selected from the class consisting of potato, tapioca and waxy maize to produce an inhibited starch, i. e., a starch characterized by the property that when mixed with water and subjected to normal gelatinizing conditions the bursting of the starch granules will be inhibited and characterized by a reduction of the natural rubbery cohesiveness of the starch when in a gelatinized state, in suspending such inhibited starch in water, gelatinizing the same, and then adding sugar to and dissolving the sugar in the gelatinized inhibited starch dispersion, then drying on heated drums the said dispersion and comminuting the resulting drum dried inhibited starch-sugar mix, the dried inhibited starch-sugar mix obtained in the drum drying step being characterized by being relatively brittle and easily removable from the drum.

6. The method of making a cold-mixing food starch powder, which consists in taking an inhibited starch selected from the class of inhibited potato, tapioca and waxy maize starches, said inhibited starch comprising a starch characterized by the property that when mixed with water and subjected to normal gelatinizing conditions the bursting of the starch granules will be inhibited and characterized by a reduction of the natural rubbery cohesiveness of the starch when in a gelatinized state, in subjecting said inhibited starch in an aqueous medium to the steps of gelatinization, drying on heated drums and comminuting the drum dried starch powder, and in adding sugar to and dissolving the sugar in the aqueous suspension of said inhibited starch prior to the drum drying step, the dried inhibited starch-sugar mix obtained in the drum drying step being characterized by being relatively brittle and easily removable from the drum.

7. The method of making a cold-mixing food starch powder, which consists in taking an inhibited starch selected from the class of inhibited potato, tapioca and waxy maize starches, said inhibited starch comprising a starch characterized by the property that when mixed with water and subjected to normal gelatinizing conditions the bursting of the starch granules will be inhibited and characterized by a reduction of the natural rubbery cohesiveness of the starch when in a gelatinized state, in subjecting said inhibited starch in an aqueous medium to the steps of gelatinization, drying on heated drums and comminuting the drum dried starch powder, and in adding sugar to and dissolving the sugar in the aqueous suspension of said inhibited starch prior to the drum drying step, the added sugar being in an amount substantially less in weight than the dry weight of the inhibited starch, the dried inhibited starch-sugar mix obtained in the drum drying step being characterized by being relatively brittle and easily removable from the drums and then adding sugar to the mix in an amount substantially greater in weight than that of the inhibited starch therein.

8. The method of making a cold-mixing food starch powder, which consists in taking an inhibited starch selected from the class of inhibited potato, tapioca and waxy maize starches, said inhibited starch comprising a starch characterized by the property that when mixed with water and subjected to normal gelatinizing conditions the bursting of the starch granules will be inhibited and characterized by a reduction of the natural rubbery cohesiveness of the starch when in a gelatinized state, in adding sugar to such inhibited starch and water to make a water suspension of said inhibited starch with the sugar dissolved therein, then gelatinizing and drying on heated drums the said suspension and comminuting the resulting drum dried inhibited starch-sugar mix, the product obtained in the drum drying step being characterized by being relatively brittle and easily removable from the drum.

ALFRED A. HALDEN.

REFERENCES CITED

The following references are of record in the file of this patent:

UNITED STATES PATENTS

| Number | Name | Date |
|---|---|---|
| 2,406,585 | Buchanan et al. | Aug. 27, 1946 |

FOREIGN PATENTS

| Number | Country | Date |
|---|---|---|
| 513,464 | Great Britain | Oct. 13, 1939 |